Figure 1:
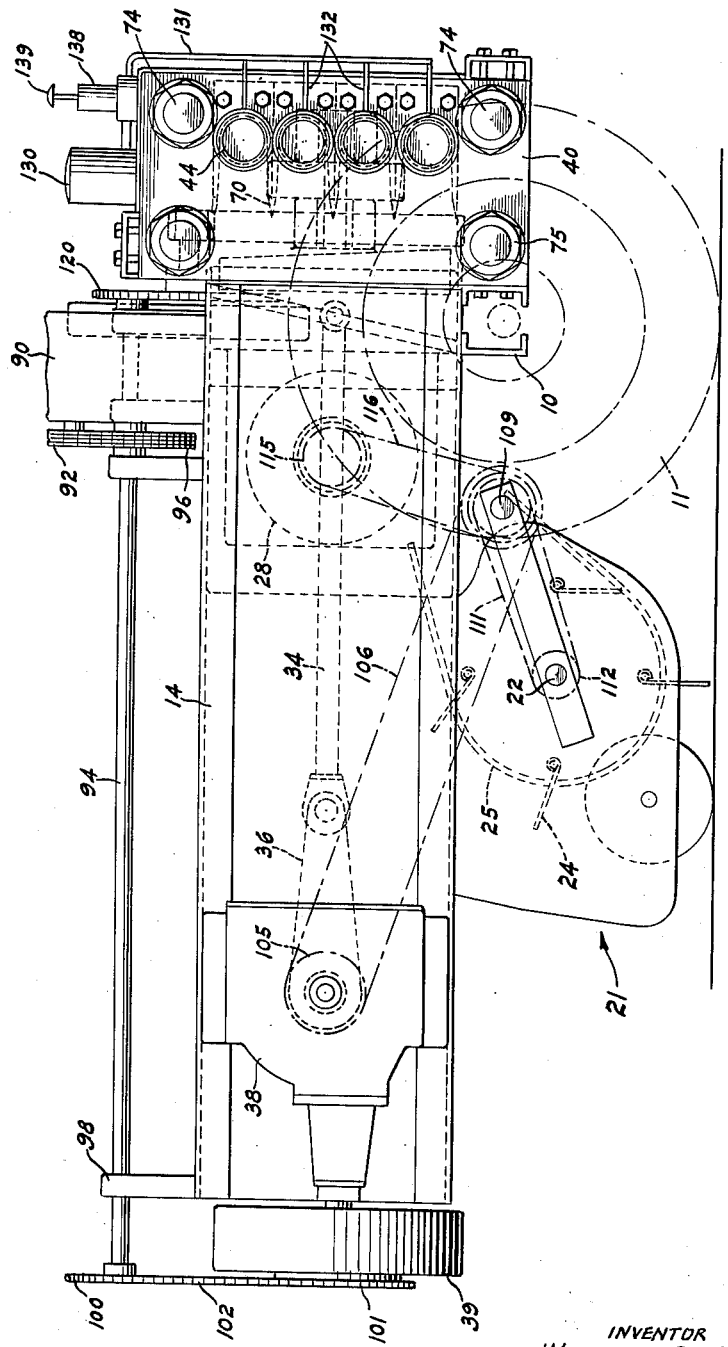

INVENTOR
WILLIAM G. SEARLES
By Joseph Allen Brown
ATTORNEY

April 24, 1962     W. G. SEARLES     3,030,876
HARVESTER
Filed May 8, 1959     4 Sheets-Sheet 3
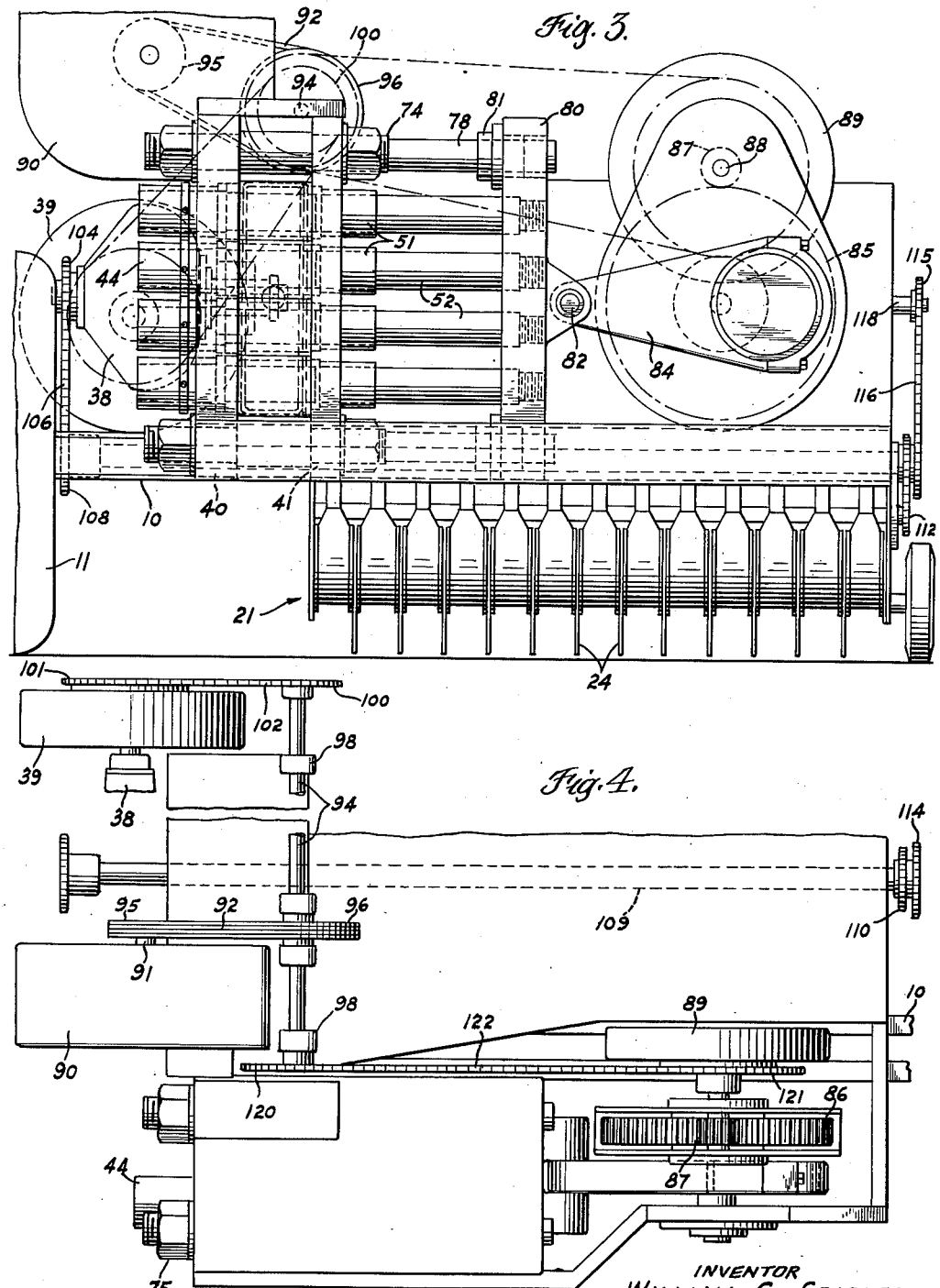
INVENTOR
WILLIAM G. SEARLES
By Joseph Allen Brown
ATTORNEY

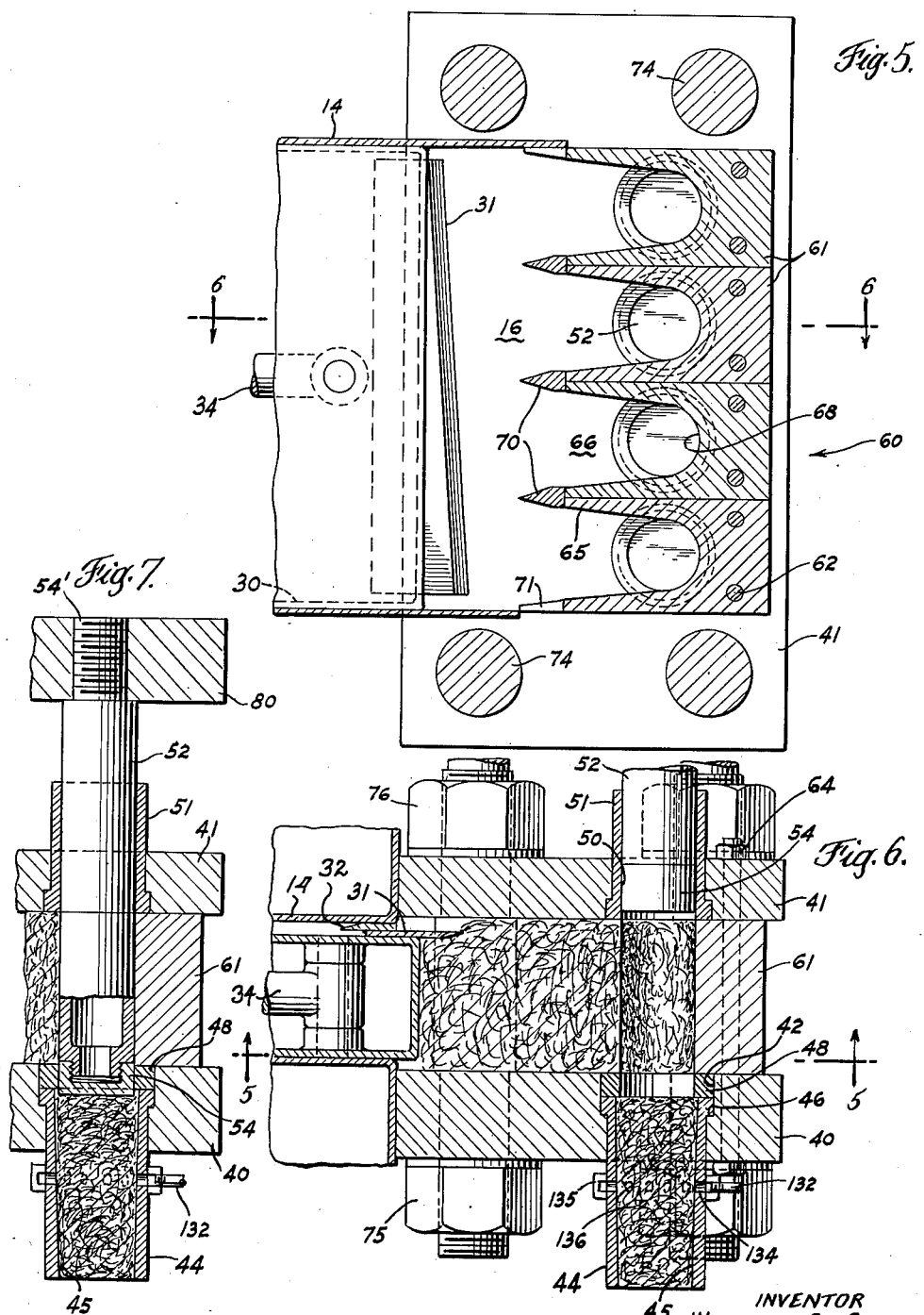

United States Patent Office 3,030,876
Patented Apr. 24, 1962

3,030,876
HARVESTER
William G. Searles, Terre Hill, Pa., assignor to Sperry Rand Corporation, New Holland, Pa., a corporation of Delaware
Filed May 8, 1959, Ser. No. 811,963
13 Claims. (Cl. 100—98)

This invention relates generally to agricultural machines and more particularly to an implement adapted to gather crop material from a field and form it into pellets.

At present, a common way to harvest hay is to use an automatic field hay baler. Such a baler picks up cut and windrowed crop material and conveys it into a bale chamber in separate charges or increments which are compressed and formed into units, a series of which produce a bale. After each bale is completed, it is banded with wire or twine and tied. Subsequently each bale is discharged onto the ground or delivered to a trailing wagon.

Most bales utilize a substantial compression of hay. Generally, the hay is about twelve times as dense when formed into a bale as when it is in a windrow ready to be picked up and baled. However, even though a bale has considerably density, it has to be tied before it leaves the baler. Otherwise, the bale slices or charges will separate one from the other when the bale is discharged.

If crop material is compressed to a greater degree than used in baling, such as three or four times as much, the hay will hold itself together and will not have to be held together with banding medium. It has been found desirable to form hay into pellets a few inches in diameter and an inch to several inches thick. Pellets this size can be readily handled with automatic equipment and fed, as is, to cattle as feed. Even though such pellets may have sufficient density to hold themselves together, animals are able to break the pellets apart and consume them.

Pelleting machines are presently available which pick up crop material from a field and form it into pellets. However, such machines are generally large, cumbersome implements which grind the hay to place it into suitable condition for forming it into very small pellet pieces usually less than an inch in diameter. Grinding the hay reduces its feed value and has other disadvantages. Usually, when such pellets are fed to animals, natural roughage has to be included with the pellets to provide a suitable feed.

One object of this invention is to provide a machine which will gather crop material from a field and operate continuously to form such material into pellets several inches in thickness and diameter and of sufficient density that they will hold themselves together without a banding medium.

Another object of this invention is to provide a machine in which all of the crop material delivered into a pellet forming region is converted into pellet form, there being no left-over material.

Another object of this invention is to provide a pelleting machine in which punch-choke means is provided for forming the hay into pellets, the chokes being so designed that once hay has been forced into them, it will not tend to "spring" back out of the chokes.

A further object of this invention is to provide a pelleting machine in which hay is conveyed in a given direction and while being so conveyed it is divided into separate sections and precompressed, and after such precompression each section is formed into a pellet.

A further object of this invention is to provide a pelleting machine which includes a plurality of pellet forming chokes which have connected to them means for delivering a suitable lubricant so that crop material may be forced from the chokes without binding.

Other objects of this invention will be apparent hereinafter from the specification and from the recital in the appended claims.

Figure 2:
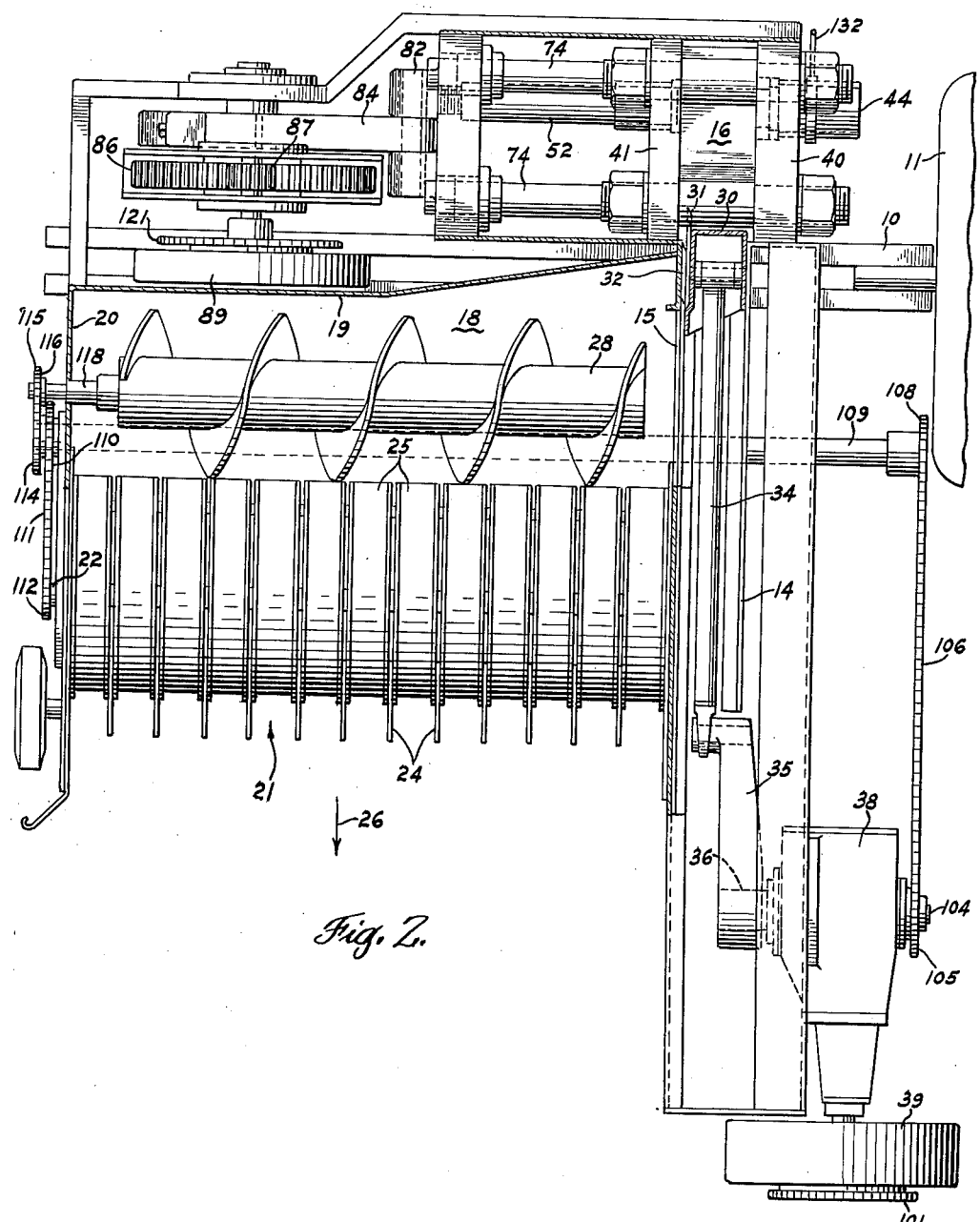

In the drawings:
FIG. 1 is a side elevation of a mobile field pelleting machine constructed according to this invention;
FIG. 2 is a plan view of FIG. 1;
FIG. 3 is a rear view of the machine;
FIG. 4 is a fragmentary, generally diagrammatic plan view of the machine and showing the drive means therefor;
FIG. 5 is a fragmentary section taken on the line 5—5 of FIG. 6 looking in the direction of the arrows, and showing on an enlarged scale severing and die means of the invention;
FIG. 6 is a section taken on the line 6—6 of FIG. 5 looking in the direction of the arrows and showing the punch of the pellet forming means at the beginning of a working stroke; and
FIG. 7 is a view similar to FIG. 6 but showing the punch in extended position to complete the pellet forming operation.

Referring now to the drawings by numerals of reference and particularly to FIGS. 1–3, 10 denotes a transverse frame member supported at its respective ends by ground wheels 11, one of which is shown. Such frame is adapted to be suitably connected to a tractor or other vehicle structure whereby the implement can be towed over a field having cut crop material to be harvested. Mounted on frame 10 and extending fore-and-aft relative thereto is a feed chamber 14 having an opening 15 in a vertical side wall thereof. Chamber 14 has a compartment 16 at its rearward end into which crop material is adapted to be delivered, as will be subsequently described. Extending laterally of the feed chamber 14 is a hay receiving platform 18 provided with an upstanding back wall 19 and a side wall 20 laterally spaced from chamber 14.

Suitably mounted in front of hay receiving platform 18 is a conventional pickup 21 comprising a reel including a shaft 22 and pickup fingers 24 movable between fore-and-aft extending laterally spaced stripper members 25. When the machine is towed forwardly, as indicated by the arrow 26 in FIG. 2, the pickup engages the cut and windrowed crop material, picks it up and conveys it rearwardly to the feed platform 18.

Extending transverse relative to the direction of travel of the machine and over platform 18 is an auger 28 suitably supported at one end on side wall 20. Auger 28 is axially aligned with the opening 15 in feed chamber 14 and it is adapted to convey crop material through such opening. The auger receives the crop material as it is delivered rearwardly from the pickup and conveys it transversely across the feed chamber 18 through opening 15 and into the chamber.

Reciprocable fore-and-aft in feed chamber 14 is a plunger 30 which moves back and forth across the opening 15 with each working and return stroke. When in retracted position, the working face of the plunger is forwardly of the opening 15. However, when the plunger is extended, as shown in FIG. 2, the plunger is positioned rearwardly of the opening. Plunger 30 carries a knife 31 which cooperates with a stationary knife 32 adjacent the rearward edge of opening 15 whereby with each rearward stroke of the plunger, the crop material in chamber 14 is cut off and separated from the crop material on platform 18. Thus, crop material is conveyed rearwardly in separate charges or increments. Plunger 30 is reciprocated like the plunger in a conventional hay baler by means including a connecting rod 34 driven by a crank arm 35 keyed to the output shaft 36 of a gear box 38. Power is supplied to the gear box by means including a conventional flywheel 39. Additional drive means will be described subsequently.

As shown best in FIGS. 5, 6 and 7, compartment 16 comprises a pair of laterally spaced, vertically extending side walls 40 and 41. As indicated in FIG. 6, when crop material is conveyed rearwardly into compartment 16, it passes in the space between these two walls. Both of these walls are fixed walls. Wall 40 has die openings 42 arranged one above the other as shown best in FIG. 1. Each die opening has therein an outwardly extending choke 44 having a bore 45 which tapers from its inner to its outer end. A shoulder 46 is provided for holding the choke in fixed position in the side wall. Interposed between the inner end of each choke and compartment 16 is a die ring 48 the bore of which is of less diameter than the inner end of its associated choke.

Aligned with the die holes 42 in wall 40 are a similarly arranged group of holes or openings 50 in wall 41. Openings 50 are provided by bearing sleeves 51 through which punches 52 are reciprocable. The diameter of each punch 52 is the same as the diameter of the bore of die ring 48, except for clearance. Each punch has a working end 54 which is disposed outside of the compartment 16 when the punch is retracted (FIG. 6). However, when each punch is extended, FIG. 7, it projects completely across the compartment 16 and into its associated die rings 48.

As shown best in FIG. 5, compartment 16 has a rear wall 60 made up of a plurality of U-shaped die members 61, mounted one above the other. In the drawing, four die members are shown. However, there could be a greater or lesser number so long as there are at least two. Each die member has the bight of the U facing rearwardly. Such bight is suitably fastened by bolts 62 and nuts 64 to the side walls 40 and 41. The legs 65 of each die member are relatively narrow at their forward ends and broaden out as they extend rearwardly. Therefore, a pocket or channel 66 having converging side walls is provided in each die member. The rearward semicircular portion 68 of each die member is formed on a radius corresponding with the radii of the punches 52 and die rings 48. The portions 68 of the die members, the punches and the die rings 48 are concentric with each other. Therefore, when the punches are reciprocated across the chamber 16, they slide against the portions 68 to thereby completely clean material out of the rearward ends of the die members and force such material into the chokes 44.

Adjoining forwardly projecting legs of the die members are provided with knife or severing means in the form of forwardly directed knife sections 70 (FIG. 5), beveled as shown. The outer legs of the top and bottom die members have beveled guide pieces 71. The knife members 70 sever material delivered rearwardly by the plunger 30 and thereby divide it into separate sections, one for each of the die pockets 66.

Walls 40 and 41 are held in fixed spaced relation by means including four shafts 74 on which nuts 75 are threaded to anchor wall 40 in place. Threaded onto an intermediate section of each of the shafts 74 are nuts 76 which engage and hold wall 41 in place. The shafts 74 have peripherally smooth portions 78 (FIG. 3) which provide guides for a slide block 80. The slide block has guide sleeves 81 through which the shafts 74 project. Suitable lubrication is provided between the parts so that the guide block may slide relative to the shafts. The outer ends 54' of the punches 52 thread into slide block 80. Thus when block 80 is reciprocated the punches are reciprocated. The side of the slide block remote from the punches has mounted thereon a pin 82 to which one end of a crank arm 84 is connected. Crank arm 84 is pivotally connected eccentrically to a bull gear 85. The bull gear has peripheral teeth 86 which mesh with the teeth of a pinion 87 carried on a shaft 88 of a flywheel 89 (FIGS. 2–4).

The driving mechanism for the various components of the machine can best be seen from FIG. 4. Mounted on top of the bale chamber 14, and other suitable supporting structure, is a motor 90 having an output shaft 91 connected through endless belts 92 to a fore-and-aft extending drive shaft 94. The belts 92 extend around pulleys 95 and 96 on the shafts 91 and 94, respectively. Suitable support blocks 98 are provided to journal the shaft 94. At its forward end, shaft 94 has a sprocket 100 connected to a sprocket 101 on the flywheel 39, by means of an endless chain 102. Therefore, power operates from the motor 91 through endless belts 92, shaft 94, chain 102, flywheel 39, gear box 38, crank 35 and connecting rod 34 to reciprocate the plunger 30.

For driving the pickup 21, drive is taken from the gear box 38 (FIG. 2) to an output shaft 104 having a sprocket 105 keyed thereon. Sprocket 105 drives through an endless chain 106 to a sprocket 108 keyed to a shaft 109 which extends across the machine to the outboard end of the pickup 21. Shaft 109 has a sprocket 110 which is connected through an endless chain 111 to a sprocket 112 keyed to the shaft 22 of the pickup reel. Also connected to the outboard end of shaft 109 is a sprocket 114 which drives a sprocket 115 through an endless chain 116; sprocket 115 is keyed on the shaft 118 of the auger 28. Therefore, it will be seen that the gear box 38 in addition to providing the power for reciprocating the plunger 30 provides the drive for operating the pickup 21 and the auger 28.

Referring further to FIG. 4, it is seen that the rearward end of the shaft 94 carries a sprocket 120 connected to a sprocket 121 through an endless chain 122. Sprocket 121 is connected to the shaft 88 which carries the flywheel 89 and drives through to the pinion 87 for rotating the bull gear 86 to thereby reciprocate the slide block 80 and thus the punches 52. In this manner, the single motor 90 operates all components of the pelleting machine.

Preferably, although not necessarily, the driving relationships provided in the machine are such that the punches 52 reciprocate in timed relation to the reciprocations of the plunger 30. Thus, the punches 52 move on working strokes across the feed chamber 16 during return strokes of the plunger.

In operation, with the machine travelling forwardly as indicated by the arrow 26 in FIG. 2, the pickup 21 engages the cut and windrowed crop material, elevates it and conveys the material rearwardly to the feed platform 18. The transversely extending rotating auger 28 engages the material and conveys it laterally toward and then through the feed opening 15 in the chamber 14. The material is able to pass into the chamber 14 when the plunger 30 is retracted. The fore-and-aft reciprocating plunger 30 transfers the material from the discharge end of the auger to the compartment 16. When the plunger 30 moves the crop material rearwardly, it forces the material against the forwardly projecting severing means, namely the knives 70. The knives separate the crop material into separate sections, there being one section of material for each of the pockets 66. As the crop material passes the knives 70, it converges towards the arcuate rearward ends of the die cavities. Therefore, the crop material is precompressed. This precompression is derived in part from the plunger 30 and in part by the reduction in space which the material passes through until it reaches the area for its ultimate formation into a pellet. This is shown best in FIG. 6 wherein the material in the die pockets is shown more compressed than the material in compartment 16 generally.

With the die pockets 66 filled with material, the punches 52 reciprocate across the chamber 16 complete removing all material from the rearward ends of each of the die members and forcing it into the chokes 44. As shown best in FIGS. 6 and 7, the diameter of the inner end of each of the chokes is larger than the inside diameter of its die ring 48. Thus, when the punches 52 move into the die rings 48, and the crop material is forced completely into the chokes 44, the material in each choke is able to expand laterally. When the punches are retracted, any tendency of the crop material to spring back into the chamber 16 is resisted by the shoulders formed between the die rings and the chokes. Therefore, a situation such as that shown in FIG. 6 is provided.

Such pellet forming operation is repeated time and again, subsequently formed pellets pushing out previously formed pellets from the chokes 44. While no mechanism is shown for receiving the pellets as they are discharged outwardly from the chokes 44, it is intended that a suitable endless conveyor be provided to receive the pellets. Thereafter, the conveyor can move the pellets to a suitable receptacle such as a trailing wagon.

When the machine has been used for pelleting, and then placed in a place of storage for subsequent use, the crop material in the chokes 44 tends to become "frozen" therein. To prevent this from occurring, there is mounted on top of the side walls 40 and 41 a lubricant supply 130 (FIG. 1). Such lubricant supply is connected through a main conduit or line 131 and short conduits 132 to each of the chokes 44. Each conduit 132 extends to an annular passage 134 around its associated choke 44 provided by a ring 135. A plurality of holes 136 are provided so that lubricant can be admitted to the bore of the chokes at angularly spaced points around the choke. In this system there is provided a pump 138 which can be manually manipulated by plunger 139 to force material from the supply into the respective chokes. Therefore, when an operator finishes using the machine, he uses the pump 138 and lubricates each of the chokes so that when the machine is next used, the pellets remaining in the chokes may be easily forced therefrom. Preferably an edible oil is used as a lubricant.

The pellets formed by the apparatus described have sufficient density that no tying medium is required to hold them together. However, animals can readily tear them apart. The machine operates in a continuous manner, the plunger 30 reciprocating in timed relation with the plungers 52 to continuously form crop material delivered to the compartment 16 into pellets.

An important feature of the machine just described is that all of the crop material fed into the machine is formed into pellets. The punches 52 completely clean out the rearward end of pockets 66 in the die members when they reciprocate across the chamber 16. Therefore, no material is left over and when the plunger 30 moves rearwardly on its next working stroke, it refills the die members for the next stroke of the punches. With this structure, "working" of the material is held to a minimum. The use of the die rings 48, in relation to the inside diameter of the inner ends of the chokes 44 prevents the spring back of material into the compartment 16. The lubricating mechanism described insures that the crop material will not become frozen in the chokes and impair the operation of the machine.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A pelleter for hay and the like comprising a feed chamber having an end wall, means for feeding crop material into said chamber and toward said end wall, there being a plurality of die cavities formed in and extending across said end wall, said die cavities having arcuate sections concentric with axes transverse to said feed chamber, means projecting forwardly of said die cavities for severing material delivered rearwardly into sections, a plurality of chokes projecting outwardly from said cavities from one side of said chamber, a plurality of punches disposed along the opposite ends of said cavities and the opposite side of said chamber, said chokes and punches being axially aligned relative to each other and to the transverse axes said arcuate sections of the cavities, and means for reciprocating said punches across said feed chamber, said punches slidably engaging said arcuate sections and pushing material out of said cavities and into said chokes.

2. A pelleter as recited in claim 1 wherein said severing means comprises knife means projecting forwardly from said end wall of said feed chamber and between successive die cavities.

3. A pelleter as recited in claim 2 wherein said knife means includes a knife having a forward cutting edge and a portion progressively increasing in thickness toward said end wall whereby material is pre-compressed as it moves into said die cavities.

4. A pelleter as recited in claim 1 wherein means is provided for lubricating said chokes to facilitate the movement of crop material therethrough.

5. A pelleter as recited in claim 1 wherein means is provided for resisting movement of material from said chokes toward said feed chamber.

6. A pelleter for hay and the like comprising a feed chamber having opposed side walls and an end wall, means operable in said chamber for forcing crop material toward said end wall, there being a plurality of die cavities formed in said end wall and extending from one of said side walls to the other side wall, said die cavities having arcuate sections concentric with axes aligned in a plane transverse to said feed chamber, means projecting forwardly between successive die cavities for severing and pre-compressing material delivered rearwardly into separate sections, one for each cavity, a plurality of chokes and punches, there being one choke and one punch for each die cavity, said chamber side walls having openings communicating with said die cavities, said chokes projecting outwardly from the openings in said one side wall and said punches from the openings in said other side wall, said chokes and punches being axially aligned relative to each other and to the transverse axes of said die cavities, and means for reciprocating said punches across said feed chamber from said other side wall to said one side wall and return to move material out of said die cavities and into said chokes, said punches slidably engaging said arcuate sections when moving across said feed chamber.

7. A pelleter as recited in claim 6 wherein the size of each punch is such relative to the size of its associated die cavity that all of the material in the arcuate rear section of the die cavities is discharged therefrom with each working stroke of said punches.

8. A pelleter as recited in claim 6 wherein said severing means comprises a knife projecting forwardly between successive die cavities and having a cutting edge forwardly of said transverse plane.

9. A pelleter as recited in claim 8 wherein each knife is tapered from a relatively wide rearward end to a forward cutting edge whereby material is precompressed when forced rearwardly into said die cavities.

10. A pelleter as recited in claim 6 wherein means is provided for lubricating said chokes.

11. A pelleter as recited in claim 6 wherein there is provided a container for a lubricant, means connecting said container to the interior of each of said chokes, and means for pumping said lubricant from said container to said chokes through said connecting means.

12. A pelleter as recited in claim 11 wherein said connecting means includes an annular conduit around each choke, each choke having a series of holes communicating with its associated conduit.

13. A pelleter as recited in claim 6 wherein means is provided for resisting the expansion of material in said choke and resulting movement inwardly toward said feed chamber.

(References on following page)

References Cited in the file of this patent

UNITED STATES PATENTS

| | | | |
|---|---|---|---|
| 72,573 | Weissenborn | Dec. 24, | 1867 |
| 364,826 | Knapp et al. | June 14, | 1887 |
| 729,149 | Fenn | May 26, | 1903 |
| 751,752 | Pilliod | Feb. 9, | 1904 |
| 1,628,850 | Klein | May 17, | 1927 |
| 1,881,171 | Cooley | Oct. 4, | 1932 |
| 2,059,229 | Gregg | Nov. 3, | 1936 |
| 2,205,865 | Schwartzkopf | June 25, | 1940 |
| 2,296,516 | Goss | Sept. 22, | 1942 |
| 2,642,793 | Heisey | June 23, | 1953 |
| 2,810,181 | Ruckstuhl | Oct. 22, | 1957 |
| 2,817,891 | Zweigle | Dec. 31, | 1957 |
| 2,833,633 | Hecht | May 6, | 1958 |
| 2,859,688 | Nolt | Nov. 11, | 1958 |